(12) United States Patent
Zhang et al.

(10) Patent No.: US 10,534,640 B2
(45) Date of Patent: Jan. 14, 2020

(54) SYSTEM AND METHOD FOR PROVIDING A NATIVE JOB CONTROL LANGUAGE EXECUTION ENGINE IN A REHOSTING PLATFORM

(71) Applicant: Oracle International Corporation, Redwood Shores, CA (US)

(72) Inventors: Weixuan (Wade) Zhang, Beijing (CN); Hui Shen, Beijing (CN); Minhui Nie, Beijing (CN); Gang (Jim) Wang, Beijing (CN); Yunbo Deng, Beijing (CN); Fangzhi Tang, Beijing (CN); Zhaoyong Zhang, Beijing (CN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 77 days.

(21) Appl. No.: 15/660,484

(22) Filed: Jul. 26, 2017

(65) Prior Publication Data
US 2018/0276036 A1 Sep. 27, 2018

Related U.S. Application Data

(63) Continuation-in-part of application No. PCT/CN2017/078914, filed on Mar. 31, 2017.
(Continued)

(51) Int. Cl.
*G06F 9/48* (2006.01)
*G06F 9/455* (2018.01)
(Continued)

(52) U.S. Cl.
CPC ............ *G06F 9/4856* (2013.01); *G06F 8/76* (2013.01); *G06F 9/45512* (2013.01);
(Continued)

(58) Field of Classification Search
None
See application file for complete search history.

(56) References Cited

U.S. PATENT DOCUMENTS 5,678,044 A * 10/1997 Pastilha .................... G06F 8/37
8,099,722 B2 * 1/2012 Fairweather ............ G06F 8/427
717/143
(Continued)

FOREIGN PATENT DOCUMENTS

| CN | 101218565 | 7/2008 |
|---|---|---|
| CN | 101727383 | 6/2010 |
| CN | 104063320 | 9/2014 |

OTHER PUBLICATIONS

Oracle®, Oracle Tuxedo Application Runtime for Batch User Guide 12c Release 2 (12.2.2), Apr. 2016, Copyright © 2010, 2016, 163 pages.
(Continued)

*Primary Examiner* — Abu Zar Ghaffari
(74) *Attorney, Agent, or Firm* — Tucker Ellis LLP

(57) ABSTRACT

A native Job Control Language (JCL) execution engine is provided in a mainframe rehosting platform/open platform for executing a migrated JCL job without converting the JCL job to another language. The JCL execution engine provides a framework which supports an internal JCL mechanism, a simulation of a plurality of mainframe utilities commonly used in JCL jobs, and a simulation of commonly used database utilities. When the JCL execution engine receives a JCL job, it generates a statement sequence from the JCL job, orders statements in the sequence into a doubly-linked sequence, and parses the doubly-linked sequence to construct a job element hierarchy tree for execution. A plurality of job initiators are provided to dequeue jobs from a job
(Continued)

queue and dispatch the jobs to the JCL execution engine or another type of execution engine.

20 Claims, 8 Drawing Sheets

Related U.S. Application Data

(60) Provisional application No. 62/476,546, filed on Mar. 24, 2017.

(51) Int. Cl.
    *G06F 9/52*       (2006.01)
    *G06F 16/22*     (2019.01)
    *G06F 8/76*       (2018.01)
    *G06F 11/14*     (2006.01)

(52) U.S. Cl.
    CPC ............ *G06F 9/485* (2013.01); *G06F 9/4843* (2013.01); *G06F 9/526* (2013.01); *G06F 16/2282* (2019.01); *G06F 11/1451* (2013.01); *G06F 2201/80* (2013.01)

(56) References Cited

U.S. PATENT DOCUMENTS

| | | | | |
|---|---|---|---|---|
| 9,880,541 | B2* | 1/2018 | Stone | G06F 9/45512 |
| 10,135,749 | B2* | 11/2018 | Soni | H04L 47/70 |
| 2006/0235811 | A1* | 10/2006 | Fairweather | G06F 8/427 |
| | | | | 706/12 |
| 2008/0276239 | A1* | 11/2008 | Collins | G06F 11/1471 |
| | | | | 718/101 |
| 2008/0288920 | A1* | 11/2008 | Takai | G06F 9/45512 |
| | | | | 717/114 |
| 2010/0088353 | A1 | 4/2010 | Lee | |
| 2010/0242024 | A1* | 9/2010 | Gonzales, II | G06F 8/51 |
| | | | | 717/125 |
| 2010/0287540 | A1* | 11/2010 | Takai | G06F 8/51 |
| | | | | 717/137 |
| 2012/0041933 | A1 | 2/2012 | Driesen | |
| 2012/0246651 | A1* | 9/2012 | Li | G06F 9/4843 |
| | | | | 718/101 |
| 2014/0019977 | A1* | 1/2014 | Kakade | G06F 8/72 |
| | | | | 718/101 |
| 2014/0143263 | A1 | 5/2014 | Ritter | |
| 2015/0019488 | A1 | 1/2015 | Higginson | |
| 2015/0089063 | A1* | 3/2015 | Soni | H04L 47/70 |
| | | | | 709/226 |
| 2015/0160934 | A1* | 6/2015 | Beit-Aharon | G06F 8/76 |
| | | | | 717/137 |
| 2016/0179573 | A1* | 6/2016 | Kneisel | G06F 9/485 |
| | | | | 718/101 |
| 2017/0192758 | A1* | 7/2017 | Apte | G06F 8/427 |
| 2017/0192777 | A1* | 7/2017 | Apte | G06F 8/427 |
| 2017/0337056 | A1* | 11/2017 | Kim | G06F 8/76 |

OTHER PUBLICATIONS

State Intellectual Property Office of the P.R. China (ISA/CN) International Searching Authority, International Search Report and Written Opinion dated Dec. 27, 2017 for International Application No. PCT/CN20171078914, 11 Pages.

* cited by examiner

SYSTEM AND METHOD FOR PROVIDING A NATIVE JOB CONTROL LANGUAGE EXECUTION ENGINE IN A REHOSTING PLATFORM

CLAIM OF PRIORITY AND CROSS-REFERENCE TO RELATED APPLICATIONS

This application is a continuation-in-part application of and claims the benefit of priority to International Patent Application No. PCT/CN2017/078914, titled "SYSTEM AND METHOD FOR DETERMINING THE SUCCESS OF A CROSS-PLATFORM APPLICATION MIGRATION", filed Mar. 31, 2017; and also claims the benefit of priority to U.S. Provisional Patent Application No. 62/476,546, titled "SYSTEM AND METHOD FOR PROVIDING A NATIVE JOB CONTROL LANGUAGE EXECUTION ENGINE IN A MAINFRAME REHOSTING PLATFORM", filed Mar. 24, 2017; and is related to U.S. patent application Ser. No. 15/660,492, titled "SYSTEM AND METHOD FOR DETERMINING THE SUCCESS OF A CROSS-PLATFORM APPLICATION MIGRATION", filed Jul. 26, 2017; each of which above patent applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for providing a native Job Control Language (JCL) execution engine in a rehosting platform.

BACKGROUND

To reduce costs and become as agile as possible, organizations today are increasingly seeking to move business-critical mainframe applications to open systems and cloud environments. When a user migrates a mainframe application (e.g., a JCL job) to an open system, e.g., Unix/Linux platform, the user needs to convert the mainframe application to another language, i.e. Shell, so that the application can be executed in the open system.

The conversion process needs another product and substantial efforts. Further, once converted, the JCL job would be totally different from the original JCL job, which makes the knowledge and skills of maintaining the original JCL job of little value, and makes it difficult to compare the converted job with the original JCL job when the user needs to determine whether the converted job has executed successfully on the mainframe rehosting platform.

SUMMARY

In accordance with an embodiment, described herein is a system and method for providing a native JCL execution engine in a mainframe rehosting platform. A batch application runtime can comprise a JCL execution engine and one or more other types of execution engines. The JCL execution engine can provide a framework for supporting an internal JCL mechanism, a simulation of a plurality of mainframe utilities commonly used in JCL jobs, and a simulation of commonly used database utilities. When the JCL execution engine receives a JCL job, it can generate a statement sequence from the JCL job, order statements in the sequence into a doubly-linked sequence, and parse the doubly-linked sequence to construct a job element hierarchy tree for execution. A plurality of job initiators are provided to dequeue jobs from a job queue and dispatch the jobs to the JCL execution engine or another type of execution engine.

DETAILED DESCRIPTION

As companies face increasing pressure to deliver more business value from their IT spending and free up funding for new business initiatives, more and more companies are migrating their mainframe applications to open systems/rehosting platforms to reduce mainframe costs and to modernize legacy applications.

As used in the document, a rehosting platform and an open platform can be used interchangeably. The Oracle™ Tuxedo Application Runtimes (ART) is an example open platform or rehosting platform.
Rehosting Platform/Open System FIG. 1 illustrates an exemplary open platform, in accordance with an embodiment.

Figure 1:
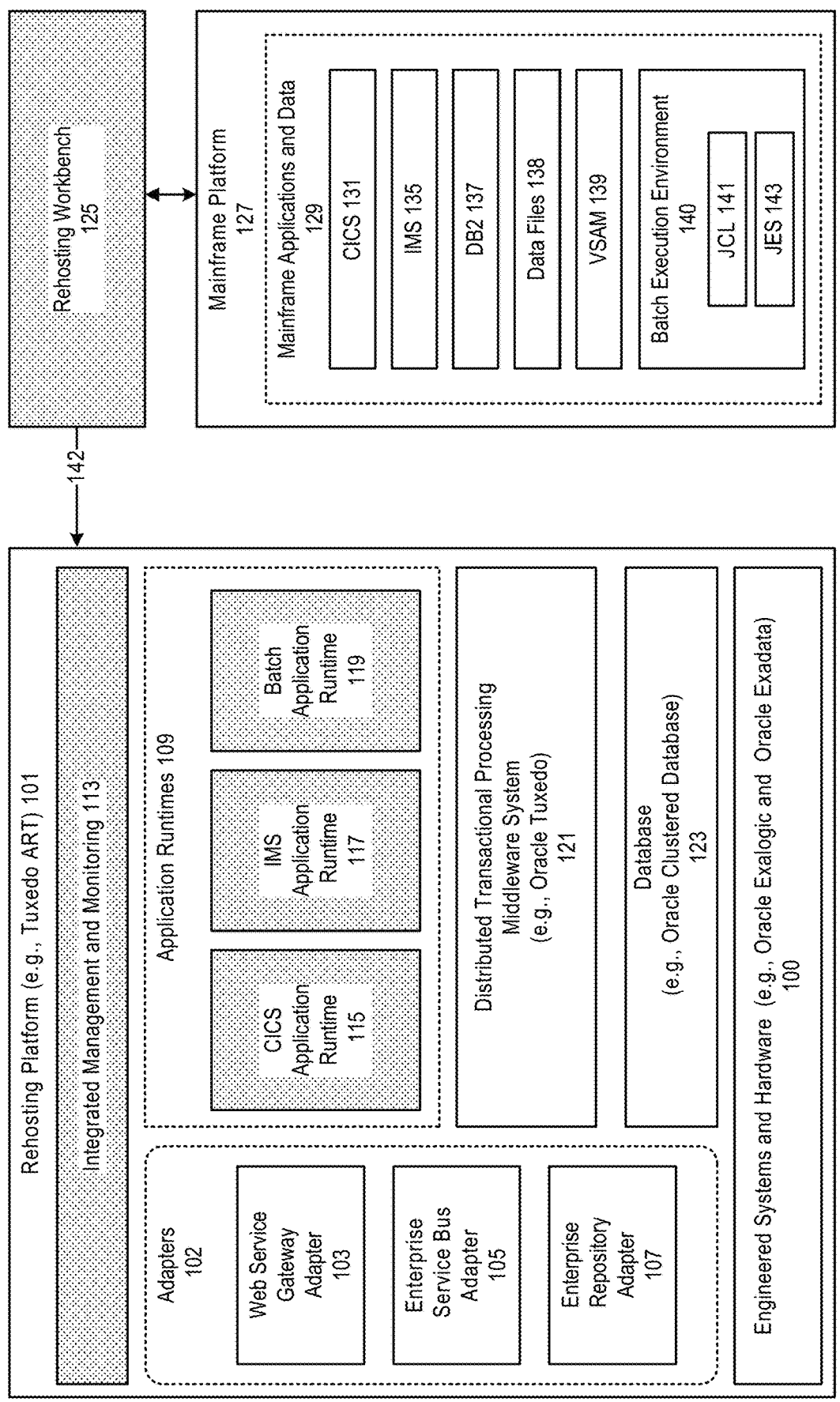
FIG. 1 illustrates an exemplary mainframe rehosting platform, in accordance with an embodiment.

As shown in FIG. 1, a rehosting platform 101 and a rehosting workbench 125 can provide an open system/platform for rehosting mainframe applications and data 129 on lower-cost platforms without losing business value or sacrificing Quality of Service (QoS).

In accordance with an embodiment, the mainframe applications and data 129 to be rehosted can currently run on a mainframe platform (mainframe platform) 127, for example, an IBM™ mainframe platform; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe platform. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe platform 127 can include a batch execution environment 140 that can support Job Control Language (JCL) 141 and a job entry subsystem (JES) 143. JES can be a major component of an operating system on the mainframe platform, can receive jobs into the mainframe platform, schedule the jobs for processing, and control their output processing.

As further shown in FIG. 1, the rehosting platform can include a software stack compatible with the mainframe platform to run mainframe applications with little to no change to minimize the risks and cost of migration; and an integrated management and monitoring component 113 for use in monitoring the rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 142 the mainframe applications 129 from the mainframe platform 127 to the rehosting platform 101.

In accordance with an embodiment, the CICS application runtime can include a set of Tuxedo servers to simulate core features of the mainframe CICS. The Tuxedo system servers can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion.

In accordance with an embodiment, the IMS application runtime can provide a set of DUI calls for use by COBOL/C applications migrated from the mainframe platform 127; a robust session environment to handle concurrent connections from a plurality of 3270 terminals; a robust execution environment to provide OLTP to process transaction codes received from the 3270 terminals via calling the migrated COBOL/C applications; and a DB plug-in on the rehosting platform.

In accordance with an embodiment, the batch application runtime 119 can include a set of Tuxedo servers to simulate mainframe JES core features.

For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe platform 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL/JCL. The code migration tools can apply sophisticated language processing to adapt COBOL code between compiler dialects, transform JCL into a script language supported on the open system, adapt SQL calls for differences between DB2 and Oracle DB. For data migration, the data migration tools can generate target schemas, including Oracle DDL, in the rehosting platform 101, and can automate data reloading to the generated target schemas.

In accordance with an embodiment, the rehosting workbench can be used in UNIX command line mode, and an Eclipse IDE graphical environment; and can generate system configuration files for the rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Figure 2:
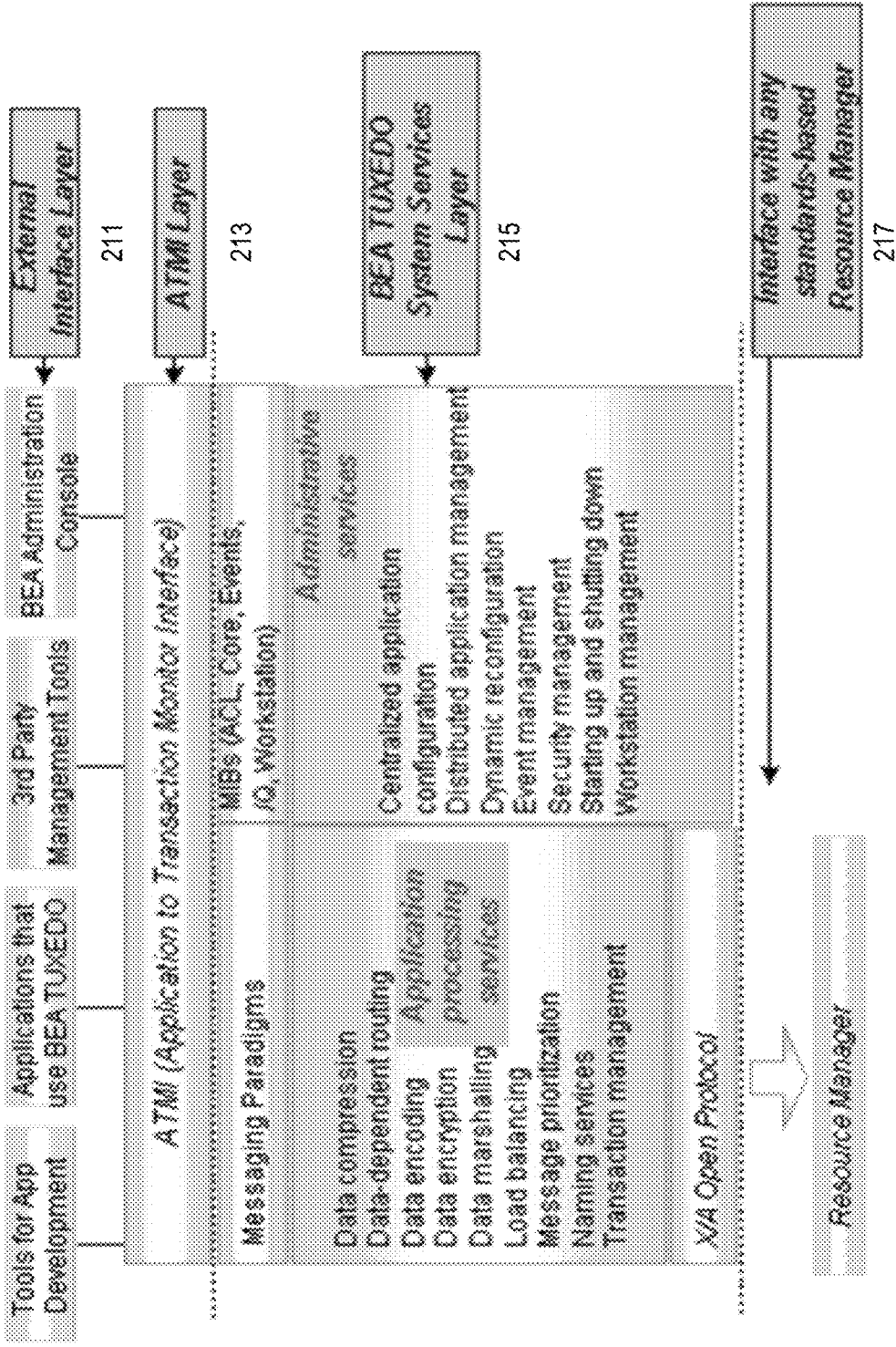
FIGS. 2-3 illustrate an example of the transactional middleware system, in accordance with an embodiment.
Figure 3:
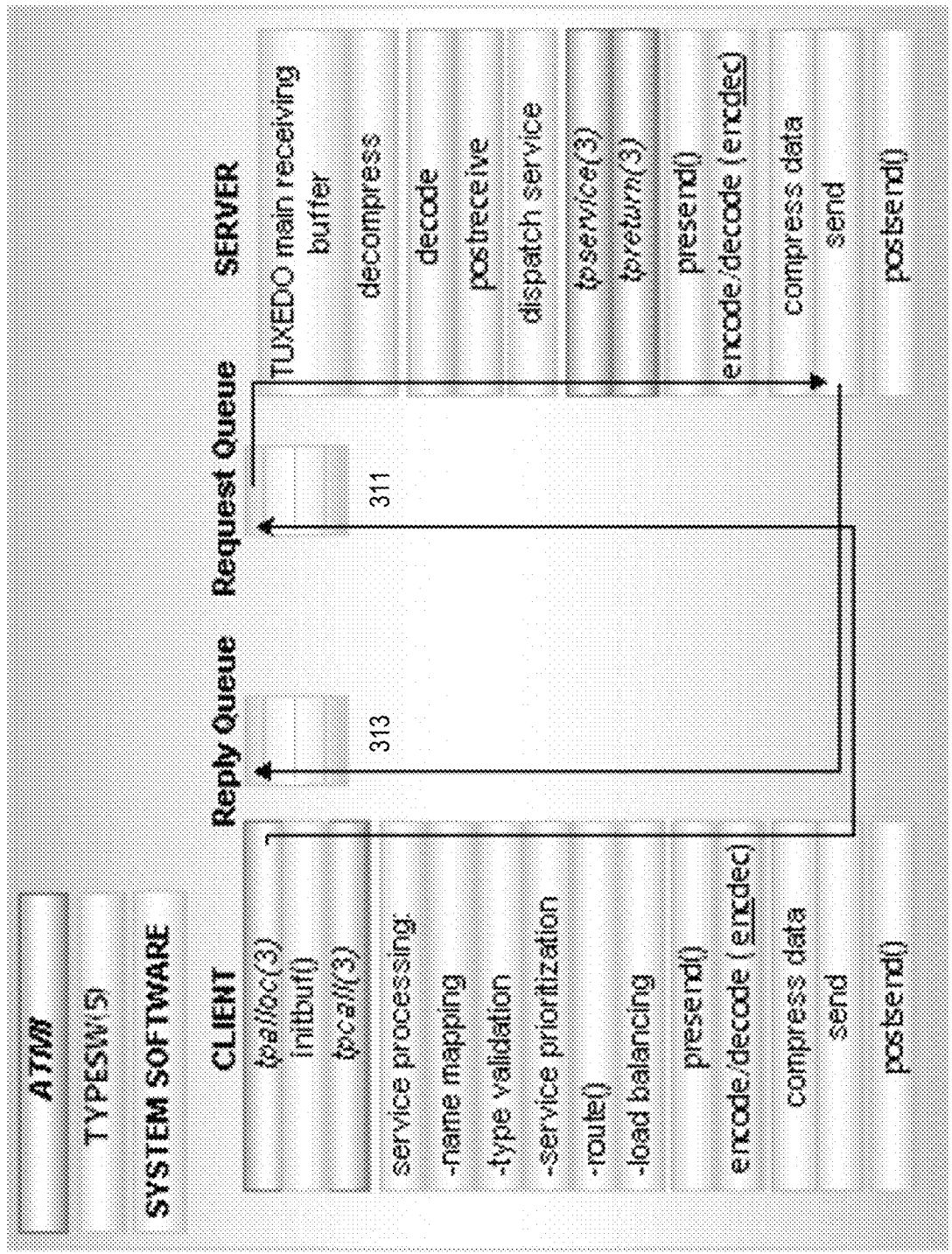

FIGS. 2-3 illustrate an example of the transactional middleware system 121 as shown in FIG. 1, in accordance with an embodiment.

In accordance with an embodiment, Tuxedo (Transactions for UNIX, Enhanced for Distributed Operation) can be an example of the transactional middleware system. Tuxedo represents a middleware product or system that can operate as an extension of an operation system (for example, UNIX). As a platform for execution and development, Tuxedo is designed for the creation and administration of e-commerce online transaction processing (OLTP) systems.

In accordance with an embodiment, the Tuxedo system shown in FIGS. 2-3 can include an Application-to-Transaction Monitor Interface (ATMI) environment for use in communications, transactions, and management of data buffers.

As shown in FIG. 2, the ATMI environment can include an external interface layer 211, an ATMI layer 213, a system services layer 215, and a resource manager layer 217. The external interface layer can provide a plurality of interfaces between users and the ATMI environment. The ATMI layer can represent an interface between applications and the ATMI environment. The system services layer can provide services and/or capabilities for developing and administering applications.

In accordance with an embodiment, the Tuxedo system can use a message-based communications system to distribute applications across various operating system platforms and databases.

As shown in FIG. 3, communication within the ATMI environment can be accomplished by transferring messages. The Tuxedo system can pass service request messages between ATMI clients and servers through operating system (OS) inter-process communications (IPC) message queues, for example, a request queue 311 and a reply queue 313. System messages and data can be passed between the OS-supported, memory-based queues of clients and servers in buffers.

In accordance with an embodiment, messages in the ATMI environment can be packaged in typed buffers, which can represent buffers that contain both message data and data identifying the types of message data being sent.

JCL Execution Engine

To avoid the issues described above that arise from converting a JCL job to another language, the system and method described herein can provide a native JCL execution engine in the rehosting platform for executing a migrated JCL job without converting the JCL job to another language.

In accordance with an embodiment, the rehosting platform can include a batch application runtime comprising a JCL execution engine. The JCL execution engine can provide a framework for supporting an internal JCL mechanism, a simulation of a plurality of mainframe utilities commonly used in JCL jobs, and a simulation of commonly used database utilities. When the JCL execution engine receives a JCL job, it can generate a statement sequence from the JCL job, order statements in the sequence into a doubly-linked sequence, and parse the doubly-linked sequence to construct a job element hierarchy tree for execution.

In accordance with an embodiment, when the JCL job is migrated from the mainframe platform to the rehosting platform, the JCL execution engine can parse and execute the job, without converting the JCL job to another language. The JCL execution engine also provides a framework for supporting a JCL internal mechanism, for example, job definitions, Data Definitions (DD), steps in a JCL job, conditional executions, PROC and INCLUDE, and JCL variables. The JCL execution engine can provide a simulation of a plurality of mainframe utilities commonly used in JCL jobs, for example, IKJEFT*, IDCAMS, SORT, IEBGENER, and IEFBR14; and a simulation of commonly used DB2 utilities, for example, DSNTIAUL, DSNUTILB, and DNSTEMP*.

In accordance with an embodiment, the features described above can remove the need to convert a JCL job to another language, so that cost and resources can be saved in migrating the JCL job. Further, maintenance cost of the migrated JCL job can be reduced, since existing mainframe maintenance resources can be reused to maintain the JCL job.

Figure 4:
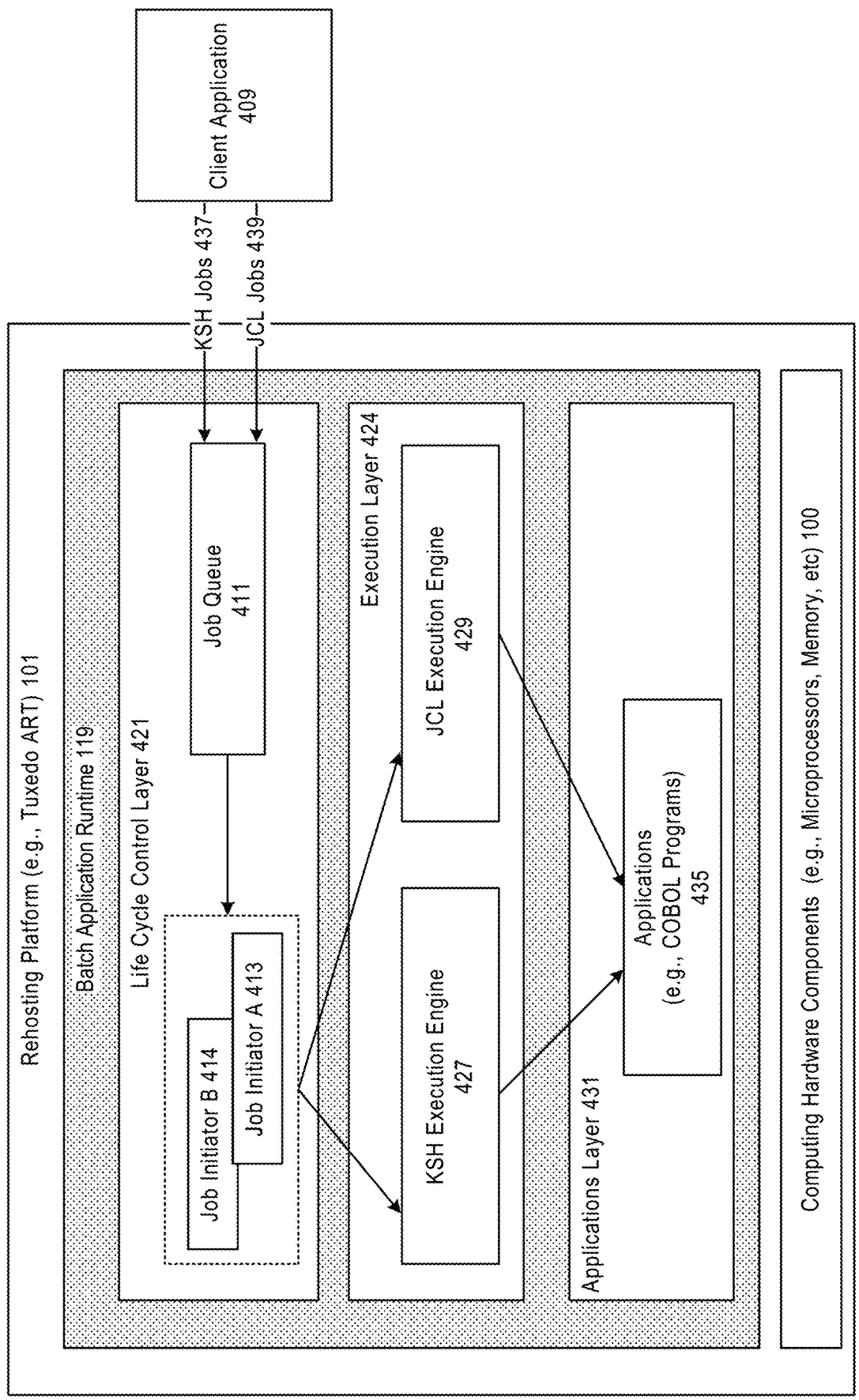
FIG. 4 illustrates a system for providing a native Job Control Language (JCL) execution engine in a rehosting platform, in accordance with embodiment.

FIG. 4 illustrates a system for providing a JCL execution engine in an open platform, in accordance with embodiment.

In accordance with an embodiment, the batch application runtime 119 can provide a combination of utilities and services that allow a mainframe batch application migrated from a mainframe platform to run on the open platform unchanged, preserving existing business logic and data.

In accordance with an embodiment, a mainframe batch application can comprise one or more JCL scripts, one or more related programs (e.g., COBOL programs), and data. When the batch application is migrated from a mainframe system to an open system, the JCL scripts can be unchanged, or can be converted into KSH scripts.

However, KSH scripts and JCL scripts are two different script languages. Converting JCL scripts into KSH scripts would render the knowledge and skills of maintaining the original application of little value, and make it difficult to compare the converted application with the original application when the need arises to determine whether the converted application has executed successfully on the rehosting platform.

In accordance with an embodiment, the rehosting platform 101 can provide native support for JCL jobs, in addition to providing support for KSH jobs. The native support can enable the rehosting platform to run the JCL scripts without converting them.

In accordance with an embodiment, a JCL job can be defined by one or more JCL scripts, and can represent a unit of work that comprises a plurality of job steps. Each job step can be specified by a set of job control statements, and can identify one or more programs (e.g., COBOL programs/applications/executables) to be executed, the inputs required, and location of the inputs and/or outputs.

In accordance with an embodiment, a JCL job can be submitted to the open system for execution via a client application using one or more JCL scripts.

Similarly, a KSH job can be defined by one or more KSH scripts, and can be submitted to the open system for execution via a client application using one or more KSH scripts.

As shown in FIG. 4, the batch application runtime 119 can provide a plurality of software modules/components in multiple layers to enable native support for JCL jobs, for example, a life cycle control layer 421, an execution layer 424, and a utilities/applications layer 431.

In accordance with an embodiment, the life cycle control layer can be configured to manage the life cycle of a JCL job, and to manage high availability, scalability, management and monitoring of the JCL job. The execution layer can include a Korn shell (KSH) execution engine 427 configured to execute KSH scripts converted from JCL scripts, and a JCL execution engine 429 configured to directly execute the JCL scripts without converting them.

As shown in FIG. 4, the life cycle control layer can include a job queue 411 that can receive submissions of KSH jobs 437 and JCL jobs 439 from a client application 409, and a plurality of job initiators (e.g., job initiator A 413, and job initiator B 414) distributed on a plurality of servers. The client application can be a command interface used to submit jobs, hold job, release jobs, cancel jobs, purge a jobs, display job information, or subscribe to events for job status changes. An example client application can be the Oracle Tuxedo client.

In accordance with an embodiment, the job queue can queue the KSH jobs and the JCL jobs, with each job associated with metadata specifying a job priority. The plurality of job initiators can be configured to dequeue jobs from the job queue, and dispatch each of the dequeued jobs, either to the job execution engine or the KSH execution engine, based on the type of the job, for example, whether the job is a KSH job or a JCL job. There can be multiple running instances of the JCL execution engine, and multiple running instances of the KSH execution engine.

In accordance with an embodiment, the utilities/applications layer 431 can include one or more z/OS built-in utilities 433 and one or more applications 435 configured to be invoked by the JCL execution engine. The applications can be the programs identified for execution in a JCL script or KSH script. An example application in this layer can be a COBOL program or a COBOL executable.

In accordance with an embodiment, when the JCL execution engine receives a JCL job, it can generate a statement sequence from the JCL job, and order statements in the sequence into a doubly-linked sequence. The JCL execution engine can execute JCLLIB & INCLUDE statements in the JCL job to include code referenced by the JCL job, and parse the statement sequence to construct a logical job element hierarchy. The job element hierarchy can include a plurality of steps (e.g., IF/THEN/ELSE/ENDIF, CNTL/ENDCNTL), each step containing one or more DDs, each DD containing one or more concatenated DDs. Finally, the JCL job can be executed.

Figure 5:
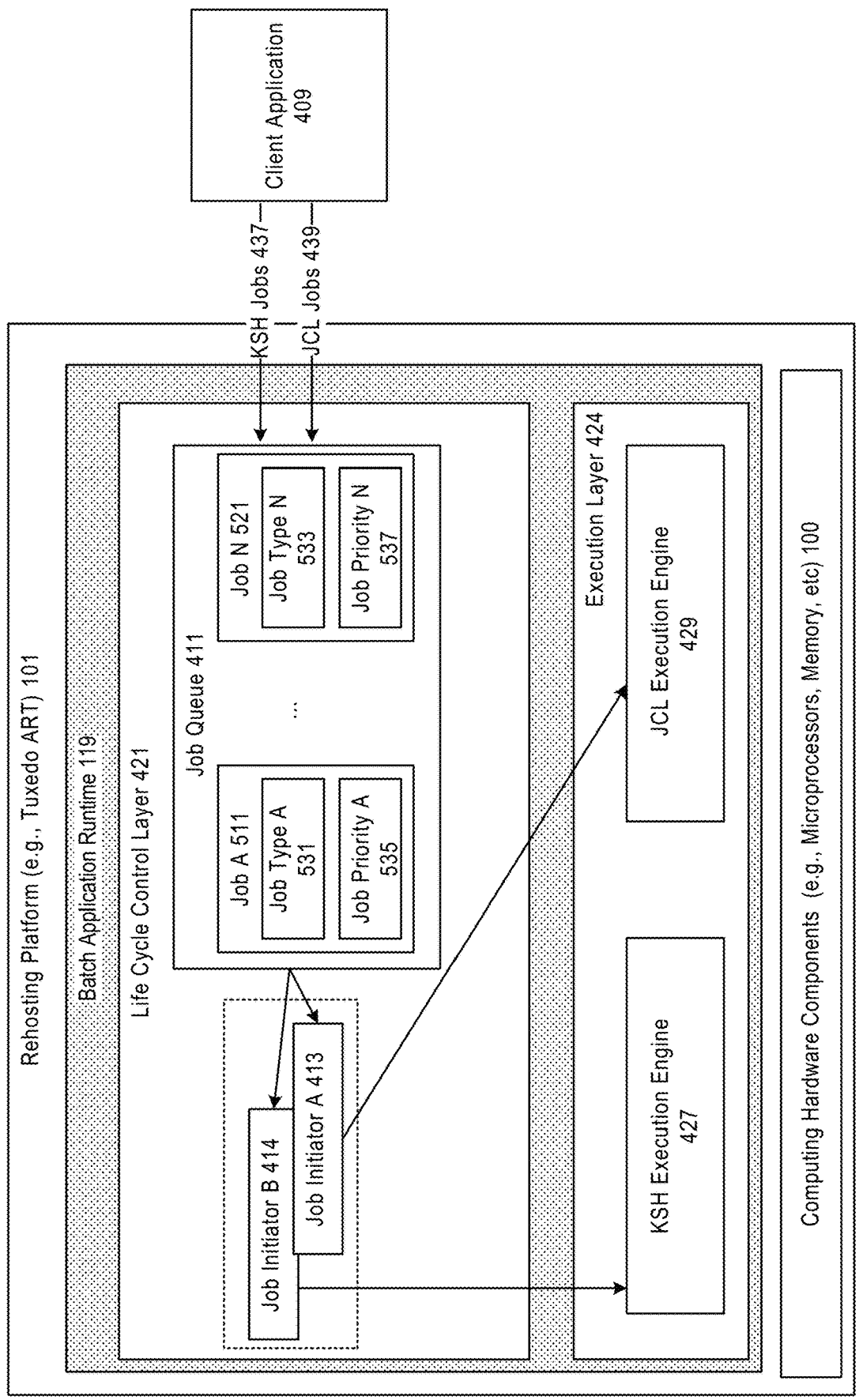
FIG. 5 further illustrates a system for providing a native Job Control Language (JCL) execution engine in a rehosting platform, in accordance with embodiment.

FIG. 5 further illustrates a system for providing a native Job Control Language (JCL) execution engine in a rehosting platform, in accordance with embodiment.

As shown in FIG. 5, the job queue can include a plurality of jobs, for example, job A 511 and job N 521, and each job can include metadata defining the type of the job 531, 533 and the priority of the job 535, 537. For example, job type A 531 can be a KSH job and job type N 533 can be a JCL job. The job priority of a job can determine whether the order in which the job is dequeued by one of the plurality of job initiators. The job priority can be specified by an integer. A job with a priority indicated by a larger integer is dequeued first than a job with a priority indicated by a smaller integer.

In accordance with an embodiment, each job initiator can be process (e.g., a Tuxedo server) that provides one or more services to a client; and can dequeue jobs of any job type. A job initiator does not execute the job it dequeues, and instead dispatches the job to either an instance of the KSH execution engine or an instance of the JCL engine based on the type of the job.

In accordance with an embodiment, in addition to the plurality of job initiators and the job queue, the life cycle control layer can include a plurality of other components, each of which can be a Tuxedo client, a Tuxedo server, or a service running on a Tuxedo server.

For example, the life cycle control layer can include a component for generating one or more security profiles for applications deployed in the life cycle control layer; a command interface for receiving job submissions; a conversion server that prepares a submitted job for execution by a batch execution engine; and a purge component for purging a completed job from the system to save resources.

In accordance with an embodiment, the life cycle control layer can be deployed on a distributed server domain with a shared file system, for example, network file system or NFS. The distributed server domain can include a configuration file (e.g., UBBCONFIG) that configures the plurality of components in the life cycle control layer.

In accordance with an embodiment, the configuration file can configure the number of job initiators and the number of purge components. The configuration file can further configure the job queue that is based on Tuxedo/Q component, specifying the name of the job queue and configuring a plurality of Tuxedo servers to support the job queue.

In an example implementation, one or more Tuxedo servers can be configured to manage global transactions of a job in the queue. A Tuxedo group with a Tuxedo messaging server and a Tuxedo user event server can be specified by the configuration file.

Similarly, in accordance with an embodiment, a plurality of KSH execution engine instances and a plurality of KSH execution engine instances can run in the rehosting platform. A job initiator can dequeue any type of job and can dispatch the dequeued job to either type of batch execution engine.

Figure 6:
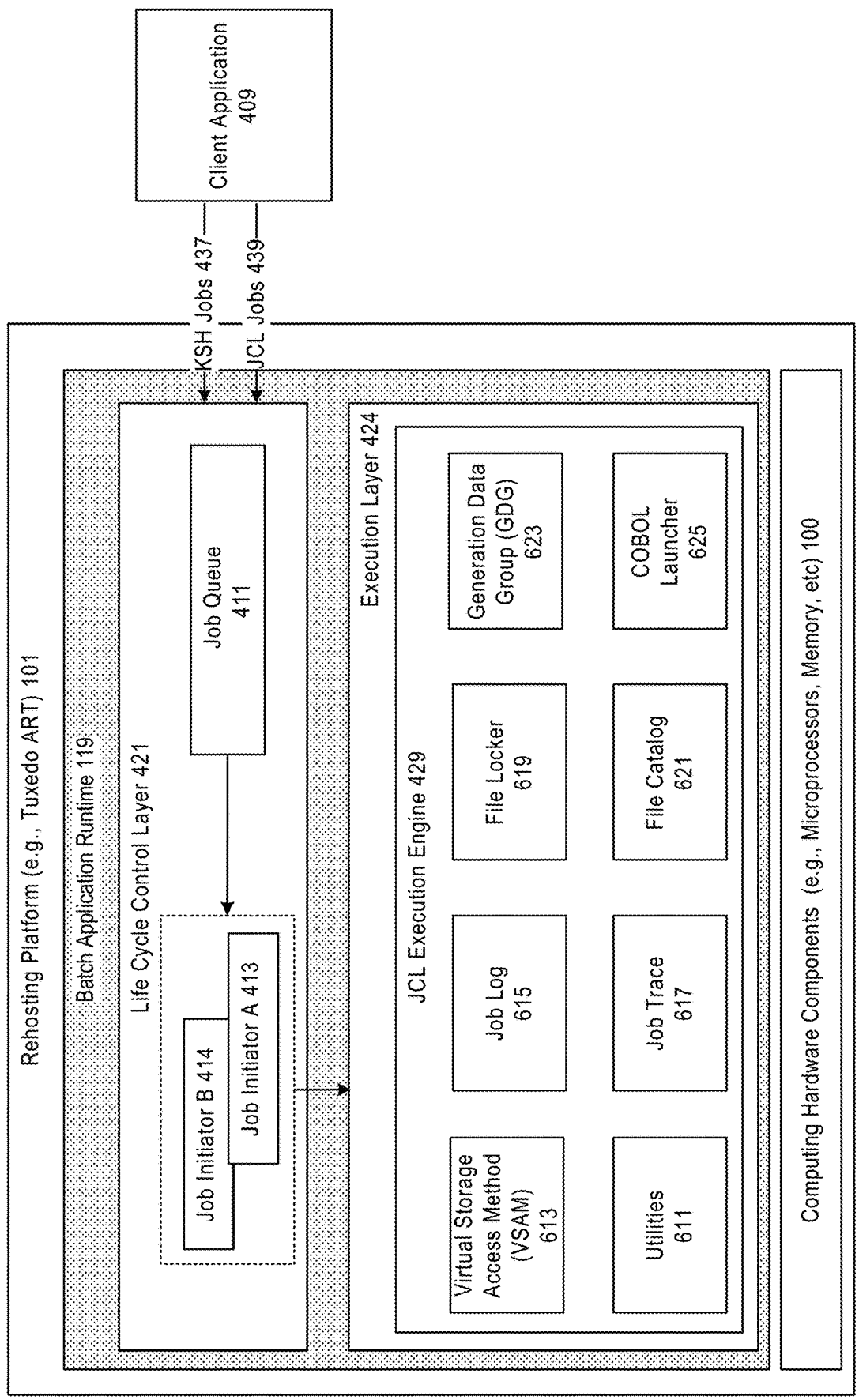
FIG. 6 further illustrates a system for providing a native Job Control Language (JCL) execution engine in a rehosting platform, in accordance with embodiment.

FIG. 6 further illustrates a system for providing a native Job Control Language (JCL) execution engine in a rehosting platform, in accordance with embodiment.

As shown in FIG. 6, in accordance with an embodiment, the JCL execution engine can include a plurality of components that in combination provide a framework for supporting a JCL internal mechanism, a simulation of a plurality of mainframe utilities commonly used in JCL jobs, and a simulation of commonly used DB2 utilities.

In accordance with an embodiment, the JCL execution engine can simulate a mainframe execution environment to support JCL dynamic executions directly on an open system/rehosting platform, without the need to convert a JCL job into a batch script.

Compared with the existing approach of calling the rehosting workbench convert a JCL job into a batch script in the background, the system can skip the conversion/translation process completely. Instead, the system can dynamically parse JCL statements in the JCL job, and execute the JCL job directly, without any interaction with the rehosting workbench.

In accordance with an embodiment, the JCL execution engine can include a virtual storage access method (VSAM) 613 component, which simulates a file storage access method used in such mainframe operation systems as multiple virtual storage (MVS), ZOS and OS/390 operating systems.

In accordance with an embodiment, a utilities component 611 can include a plurality of utilities to simulate functionalities of the corresponding utilities on a mainframe system to support the JCL execution engine.

For example, the utilities component can include a DSNUTILB utility configured to load data into and unload data from an Oracle table on the rehosting platform. On the mainframe system, the DSNUTILB utility is configured to load data into and unload data from a DB2 table.

The utilities component can also include a DSNUTILT-IAUL for executing data manipulation language (DML) to perform search, delete, insert, and update operations in an Oracle table. The corresponding utility on a mainframe system would perform search, delete, insert and update operations in a DB2 table.

In accordance with an embodiment, a job log 615 component can be used to store execution results, job starting and ending times, and return codes. The job trace component 617 can be used to store more detailed log messages of a JCL job execution for debugging the JCL job; and can be configured to store different levels of log messages.

In accordance with an embodiment, a file catalog component 621 can be used to view files including one or more files containing code of a JCL job, and one or more files that the JCL job accesses during its execution.

In accordance with an embodiment, the JCL execution engine can include a generation data group (or GDG) component/facility 623 for creating a GDG, which can represents a group of related files. The files in a GDG can be referenced individually or as a group. The files (or generations) within the GDG are assigned names derived from the name of the GDG base. The individual files within the group have a generation number added to the end of the name to make each file name unique.

For example, if the GDG base is called "ORACL.DATA.GDGROUP1", then the first file created within the GDG can be given the name "ORACLE. DATA. GDGROUP1.G0001V00". Subsequent files are then named by incrementing the generation number resulting in filenames ending in G0002V00 through G9999V00. Once the G9999V00 is reached, the numbering can start again from G0001V00. The two zeroes at the end of the name are used to represent a volume number that is used when the file is stored on media requiring the use of multiple volumes.

In accordance with an embodiment, the GDG allows a JCL job to access one or more data files (data sets) either by specifying an absolute generation number or a relative generation. By using the relative generation, a JCL job does not need to be changed each time the JCL is to be executed.

In accordance with an embodiment, a file locker component 619 can put a lock on a file (e.g., a data set/generation) in an GDG when the file is being accessed by an executing JCL job or an executing KSH job, so that the file being locked cannot be accessed by another JCL job or another KSH. There can be different types of locks, for example, a high-level lock or a low-level lock A high-level lock does not allow a locked file to be read and written to, while a low-level lock does not allow a locked file to read, but still allow the file to be read.

In accordance with an embodiment, before a JCL job or a KSH job dequeued by a job initiator is dispatched to a corresponding batch execution engine for execution, the job initiator first needs to invoke the file locker component to determine if all the files that the JCL job or the KSH job needs to access are available (not locked).

In accordance with an embodiment, when determining the availability of the files needed for the execution of the JCL job or the KSH job, the file locker component can differentiate the level of lock put on a file.

For example, if the JCL job or the KS job only needs to have read-access to a file, the file, if locked with a low-level lock, can still be considered available for the execution of the JCL job or the KSH job, since the file can still be read.

In accordance with an embodiment, the file locker, which prevents concurrent jobs from accessing a particular file at the same time, cannot be replaced by a file-locking mechanism provided by an operating system.

As further shown in FIG. 6, the JCL execution engine further include a COBOL launcher 625 used to launch a COBOL program migrated from the mainframe system.

Figure 7:
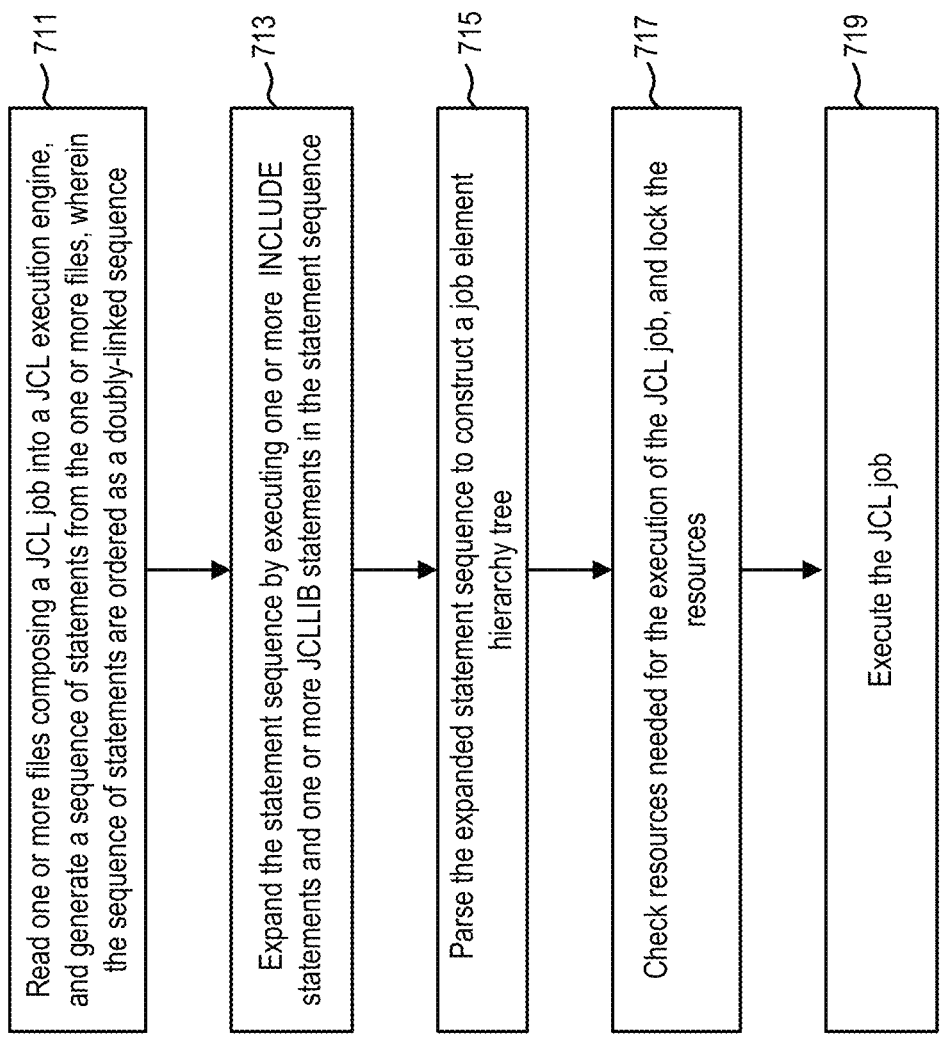
FIG. 7 illustrates an execution flow of a JCL job in a JCL execution engine provided in a rehosting platform, in accordance with an embodiment.

FIG. 7 illustrates an execution flow of a JCL job in a JCL execution engine provided in a rehosting platform, in accordance with an embodiment.

As shown in FIG. 7, at step 711, one or more file composing a JCL job are read into a JCL execution engine, wherein a sequence of statements is generated from the one or more files, and wherein the sequence of statements are ordered as a doubly-linked sequence.

At step 713, the statement sequence is expanded by executing one or more INCLUDE statements and one or more JCLLIB statements in the statement sequence.

In accordance with an embodiment, during the expansion, the JCL execution engine can execute the INCLUDE statements and the JCLLIB statements. A JCLLIB statement can be used to locate a file to be included in the JCL job, and an INCLUDE statement can be used to insert the located file into the JCL job. The JCLLIB statement can include an ORDER parameter indicating which file to use when more than one files with the same name are located, for example, in different locations. After the INCLUDE statements and JCLLIB statements are executed, they can be removed from the statement sequence.

At step 715, the expanded statement sequence is parsed to construct a job element hierarchy tree, which describes the path of execution of the JCL job.

At step 717, the resources needed for the execution of the JCL job are checked, and the needed resources are locked to prevent other jobs from accessing the resources.

At step 719, the JCL job is executed.

Figure 8:
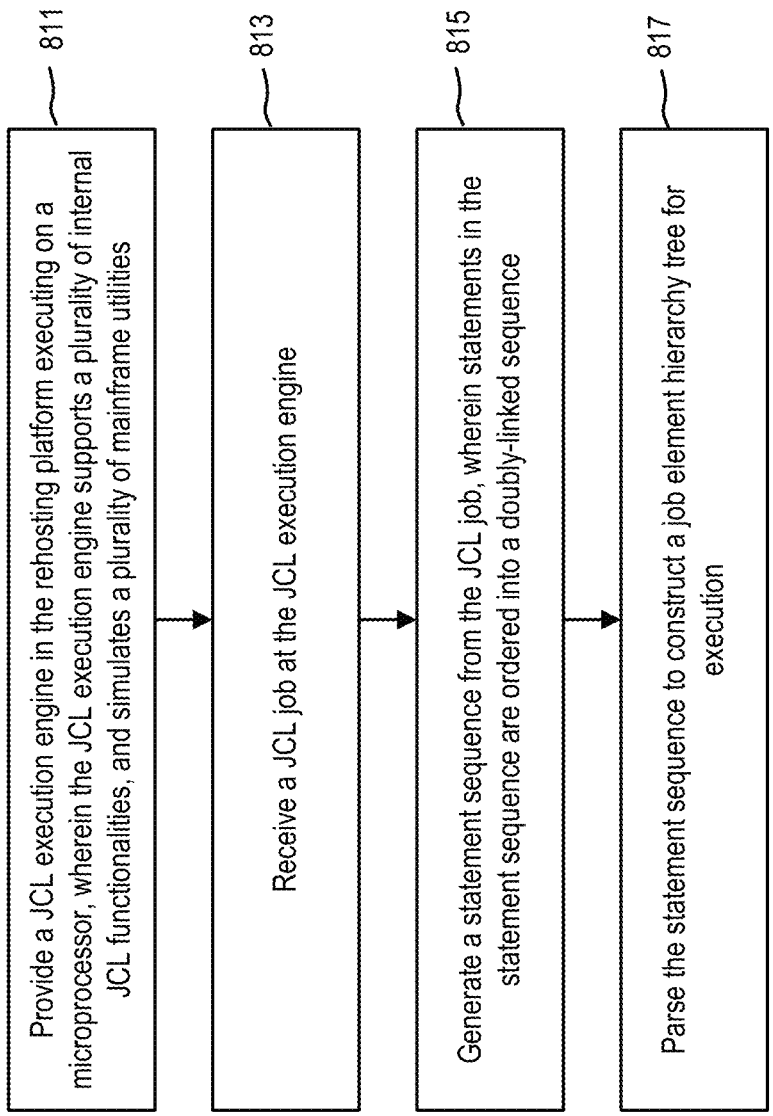
FIG. 8 illustrates a method providing a native Job Control Language (JCL) execution engine in a rehosting platform, in accordance with embodiment.

FIG. 8 illustrates a method for providing a native Job Control Language (JCL) execution engine in a rehosting platform, in accordance with embodiment.

As shown in FIG. 8, at step 811, a JCL execution engine is provided in the rehosting platform executing on a microprocessor, wherein the JCL execution engine supports a plurality of internal JCL functionalities, and simulates a plurality of mainframe utilities.

At step 813, a JCL job is received at the JCL execution engine.

At step 815, a statement sequence is generated from the JCL job, wherein statements in the statement sequence are ordered into a doubly-linked sequence.

At step 817, the doubly-linked sequence is parsed to construct a job element hierarchy tree for execution.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for executing native Job Control Language (JCL) jobs in an open platform comprising a distributed transactional processing system, comprising:
   a microprocessor;
   a JCL execution engine executing on the microprocessor in the open platform, wherein the JCL execution engine supports a plurality of internal JCL functionalities, and a plurality of simulated mainframe utilities, wherein the plurality of internal JCL functionalities comprise, JCL job definitions, JCL data definitions, JCL conditional executions, and JCL variables;

wherein the JCL execution engine is configured to perform steps comprising:
receiving a JCL job written in native Job Control Language;
generating, from the JCL job, a statement sequence comprising a plurality of statements corresponding to the JCL job;
ordering the plurality of statements of the statement sequence into a doubly-linked sequence; and
parsing the doubly-linked sequence to construct a job element hierarchy tree for execution; and
executing the JCL job on the open platform using the job element hierarchy tree, the plurality of JCL functionalities and the plurality of simulated mainframe utilities, without converting the JCL job into another language.

2. The system of claim 1, wherein the JCL execution engine is configured to check resources needed for executing the JCL job after constructing the job element hierarchy tree and before executing the JCL job.

3. The system of claim 1, wherein the JCL execution engine is configured to check resources needed for executing the JCL job after constructing the job element hierarchy tree and lock said resources needed for executing the JCL job before executing the JCL job.

4. The system of claim 2, further comprising
a JCL life cycle control layer;
wherein the JCL life cycle control layer includes a job queue and a plurality of job initiators; and
wherein each of the plurality of job initiators dequeues a job from the job queue and dispatches the job to the JCL execution engine.

5. The system of claim 4, wherein the job queue is a physical queue or a logical queue.

6. The system of claim 5, wherein each job in the job queue is associated with metadata defining a type of the job and one or more files that the job needs to access.

7. The system of claim 1, wherein the JCL execution engine includes a file locker configured to lock one or more files being accessed by a JCL job to prevent said one or more files being accessed concurrently by another JCL job.

8. The system of claim 1, wherein the open platform is deployed in a cloud environment.

9. A method for providing a native Job Control Language (JCL) execution engine in an open platform comprising a distributed transactional processing system, the method comprising:
providing a JCL execution engine in the open platform executing on a microprocessor, wherein the JCL execution engine supports a plurality of internal JCL functionalities, and a plurality of simulated mainframe utilities, wherein the plurality of internal JCL functionalities comprise, JCL job definitions, JCL data definitions, JCL conditional executions, and JCL variables;
receiving a JCL job written in native Job Control Language at the JCL execution engine;
generating a statement sequence from the JCL job, wherein the statement sequence comprises a plurality of statements corresponding to the JCL job;
ordering the plurality of statements in the statement sequence into a doubly-linked sequence;
parsing the doubly-linked sequence to construct a job element hierarchy tree for execution; and
executing the JCL job on the open platform using the job element hierarchy tree, the plurality of JCL functionalities and the plurality of simulated mainframe utilities, without converting the JCL job into another language.

10. The method of claim 9, further comprising:
checking resources needed for executing the JCL job after constructing the job element hierarchy tree and before executing the JCL job.

11. The method of claim 9, further comprising:
checking resources needed for executing the JCL job after constructing the job element hierarchy tree and locking said resources needed for executing the JCL job before executing the JCL job.

12. The method of claim 10, further comprising
providing a JCL life cycle control layer;
wherein the JCL life cycle control layer includes a job queue and a plurality of job initiators; and
wherein each of the plurality of job initiators dequeues a job from the job queue and dispatches the job to the JCL execution engine.

13. The method of claim 12, wherein the job queue is a physical queue or a logical queue.

14. The method of claim 13, wherein each job in the job queue is associated with metadata defining a type of the job and one or more files that the job needs to access.

15. The method of claim 9, wherein the JCL execution engine includes a file locker configured to lock one or more files being accessed by a JCL job to prevent said one or more files being accessed concurrently by another JCL job.

16. The method of claim 9, wherein the open platform is deployed in a cloud environment.

17. A non-transitory computer-readable storage medium storing a set of instructions for providing a native Job Control Language (JCL) execution engine in an open platform comprising a distributed transactional processing system, said instructions, when executed by one or more microprocessors of the open platform, causing the open platform to perform steps comprising:
providing a JCL execution engine in the open platform executing on a microprocessor, wherein the JCL execution engine supports a plurality of internal JCL functionalities, and a plurality of simulated mainframe utilities, wherein the plurality of internal JCL functionalities comprise, JCL job definitions, JCL data definitions, JCL conditional executions, and JCL variables;
receiving a JCL job written in native Job Control Language at the JCL execution engine;
generating a statement sequence from the JCL job, wherein the statement sequence comprises a plurality of statements corresponding to the JCL job;
ordering the plurality of statements in the statement sequence into a doubly-linked sequence;
parsing the doubly-linked sequence to construct a job element hierarchy tree for execution; and
executing the JCL job on the open platform using the job element hierarchy tree, the plurality of JCL functionalities and the plurality of simulated mainframe utilities, without converting the JCL job into another language.

18. The non-transitory computer readable storage medium of claim 17, wherein the instructions further cause the one or more microprocessors to perform further steps comprising:
checking resources needed for executing the JCL job after constructing the job element hierarchy tree and before executing the JCL job.

19. The non-transitory computer readable storage medium of claim 17, wherein the instructions further cause the one or more microprocessors to perform further steps comprising:
  checking resources needed for executing the JCL job after constructing the job element hierarchy tree and locking said resources needed for executing the JCL job before executing the JCL job.

20. The non-transitory computer readable storage medium of claim 18, wherein the instructions further cause the one or more microprocessors to perform further steps comprising:
  providing a JCL life cycle control layer;
  wherein the JCL life cycle control layer includes a job queue and a plurality of job initiators; and
  wherein each of the plurality of job initiators dequeues a job from the job queue and dispatches the job to the JCL execution engine.

\* \* \* \* \*

UNITED STATES PATENT AND TRADEMARK OFFICE
CERTIFICATE OF CORRECTION

PATENT NO. : 10,534,640 B2  
APPLICATION NO. : 15/660484  
DATED : January 14, 2020  
INVENTOR(S) : Zhang et al.

Page 1 of 1

It is certified that error appears in the above-identified patent and that said Letters Patent is hereby corrected as shown below:

On the Title Page

On page 2, Column 2, item (56) under Other Publications, Line 4, delete "PCT/CN20171078914," and insert -- PCT/CN2017/078914, --, therefor.

In the Specification

In Column 1, Line 21, delete "15,660,492," and insert -- 15/660,492, --, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*